United States Patent [19]
Donner et al.

[11] Patent Number: 5,813,699
[45] Date of Patent: Sep. 29, 1998

[54] STEERING DEVICE FOR MOTOR VEHICLES

[75] Inventors: Harald Donner, Meinerzhagen; Ralf Heinze, Lüdenscheid; Meinolf Kathol, Finnentrop; Jörg Welschholz, Herscheid, all of Germany

[73] Assignee: Leopold Kostal GmbH & Co. KG, Germany

[21] Appl. No.: 538,366

[22] Filed: Oct. 3, 1995

[30] Foreign Application Priority Data

Oct. 10, 1994 [DE] Germany ............ 44 36 091.6

[51] Int. Cl.⁶ ........................................ B62D 1/18
[52] U.S. Cl. ........................................ 280/775; 74/493
[58] Field of Search ........................ 280/775, 771, 280/776, 779; 74/493, 492

[56] References Cited

U.S. PATENT DOCUMENTS

| | | | |
|---|---|---|---|
| 4,607,540 | 8/1986 | Kinoshita et al. | 74/493 |
| 4,793,204 | 12/1988 | Kubasiak | 74/493 |
| 4,934,737 | 6/1990 | Nakatsuka | 280/775 |
| 5,035,446 | 7/1991 | Arridsson | 280/775 |
| 5,294,149 | 3/1994 | Haldric et al. | 280/775 |
| 5,449,199 | 9/1995 | Heinrichs et al. | 280/775 |

FOREIGN PATENT DOCUMENTS

| | | | |
|---|---|---|---|
| 0402133 | 12/1990 | European Pat. Off. | 280/775 |
| 3933288 | 4/1990 | Germany . | |
| 4210130 | 10/1992 | Germany . | |

*Primary Examiner*—Christopher P. Ellis
*Attorney, Agent, or Firm*—Brooks & Kushman P.C.

[57] ABSTRACT

A steering device for motor vehicles having a steering column positionable in the axial and/or radial direction, in each case over a preset displacement range, via at least one positioning device actuated by external force. Locking of the steering column is implementable by a positioning device such that, when the motor vehicle is switched off, the steering column is positioned thereby into a position lying outside the displacement range(s) in which a torsional force exerted on the steering column via the steering wheel is not transmittable to the steering gear.

26 Claims, 4 Drawing Sheets

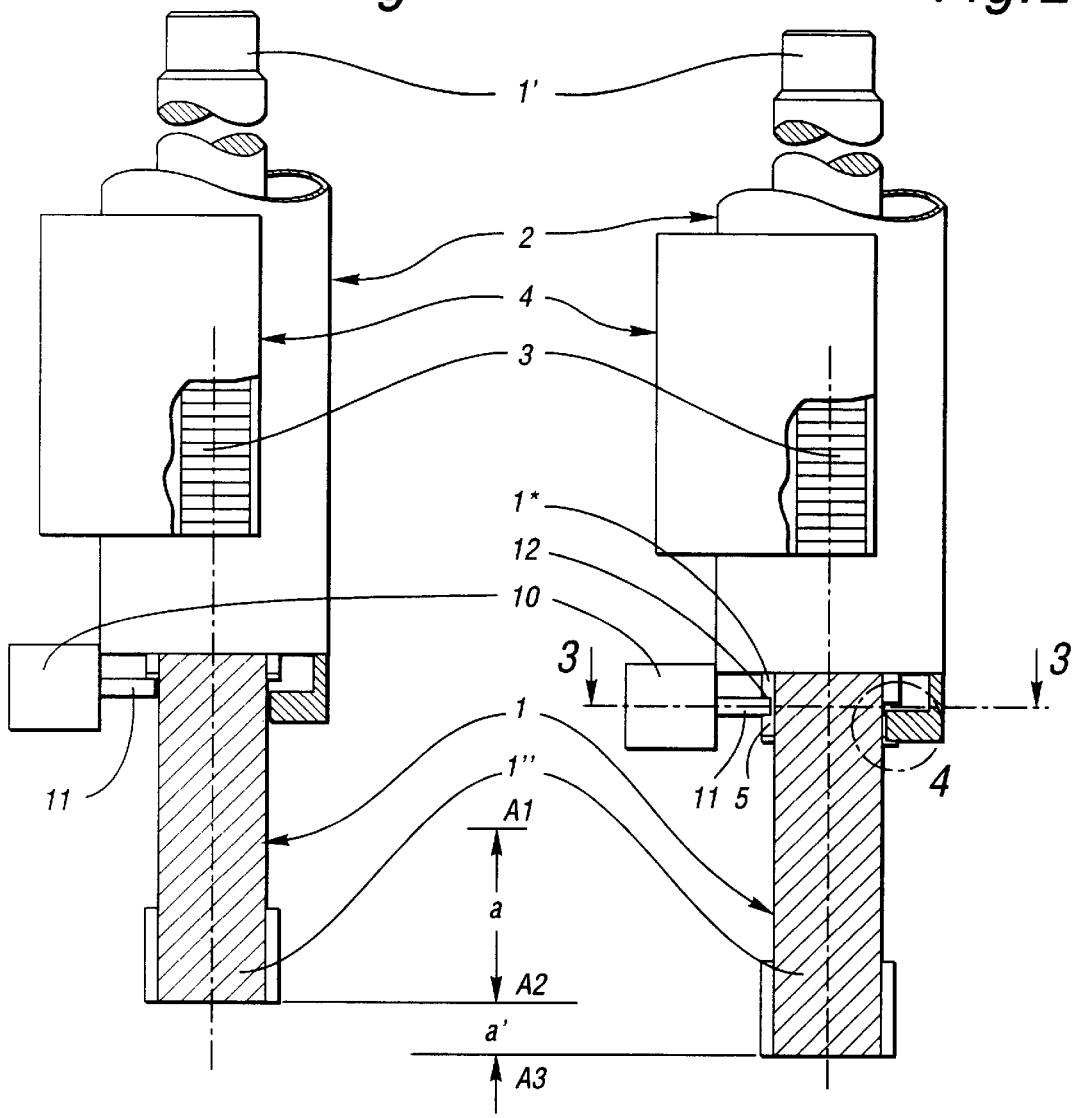
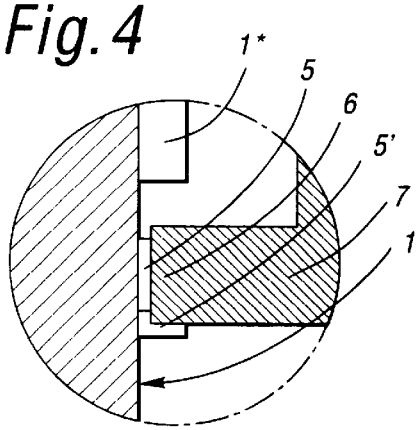
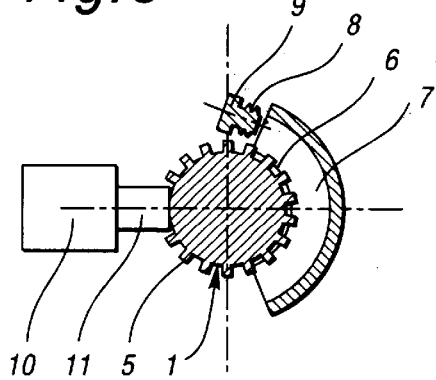

STEERING DEVICE FOR MOTOR VEHICLES

TECHNICAL FIELD

The present invention relates to a steering device for motor vehicles in which the steering device is positionable within a preset displacement range.

BACKGROUND ART

Today, steering devices are used in an increasing extent in motor vehicles, such steering devices allowing displacement of the steering column and thus the steering wheel in the axial and/or radial direction for the purposes of increasing the ease of use and, in particular, for adapting to the physical conditions of several persons using the same motor vehicle. The displacements are generally each carried out via a positioning device driven by an electric motor, wherein, for example, the axial displacement takes place in the manner of a rack and pinion drive and the radial displacement via a spindle drive.

Furthermore, a steering lock acting mechanically or electromechanically is generally allocated to the steering column in order at least to make more difficult, if not to prevent, the unauthorized use or the theft of a motor vehicle.

SUMMARY OF THE INVENTION

An object of the present invention is to effectively isolate the steering gear from the steering wheel when the steering column is displaced axially and/or radially outside a preset displacement range.

According to the invention, the object is achieved in a steering device having a steering column at least partly surrounded by a casing tube. One end of the steering column is connected to a steering wheel and the other end is allocated to a steering gear. The steering column is positionable in an axial and/or radial direction within at least one preset displacement range. The displacement range comprises at least one positioning device actuated by external force. The positioning device when the motor vehicle is switched off, positions the steering column into a position A3 lying outside the displacement range (a), of which there is at least one, so that a torsional force exerted on the steering column via the steering wheel is not transmittable to the steering gear.

In such a construction, it is advantageous that, under certain circumstances, only one positioning device actuated by external force is required both for the axial and/or radial displacement of the steering column and for the locking thereof.

Further advantageous embodiments of the object according to the invention are specified in the sub-claims and are explained in greater detail with reference to two embodiments illustrated in the drawing.

BEST MODE FOR CARRYING OUT THE INVENTION

Figures 1, 2:
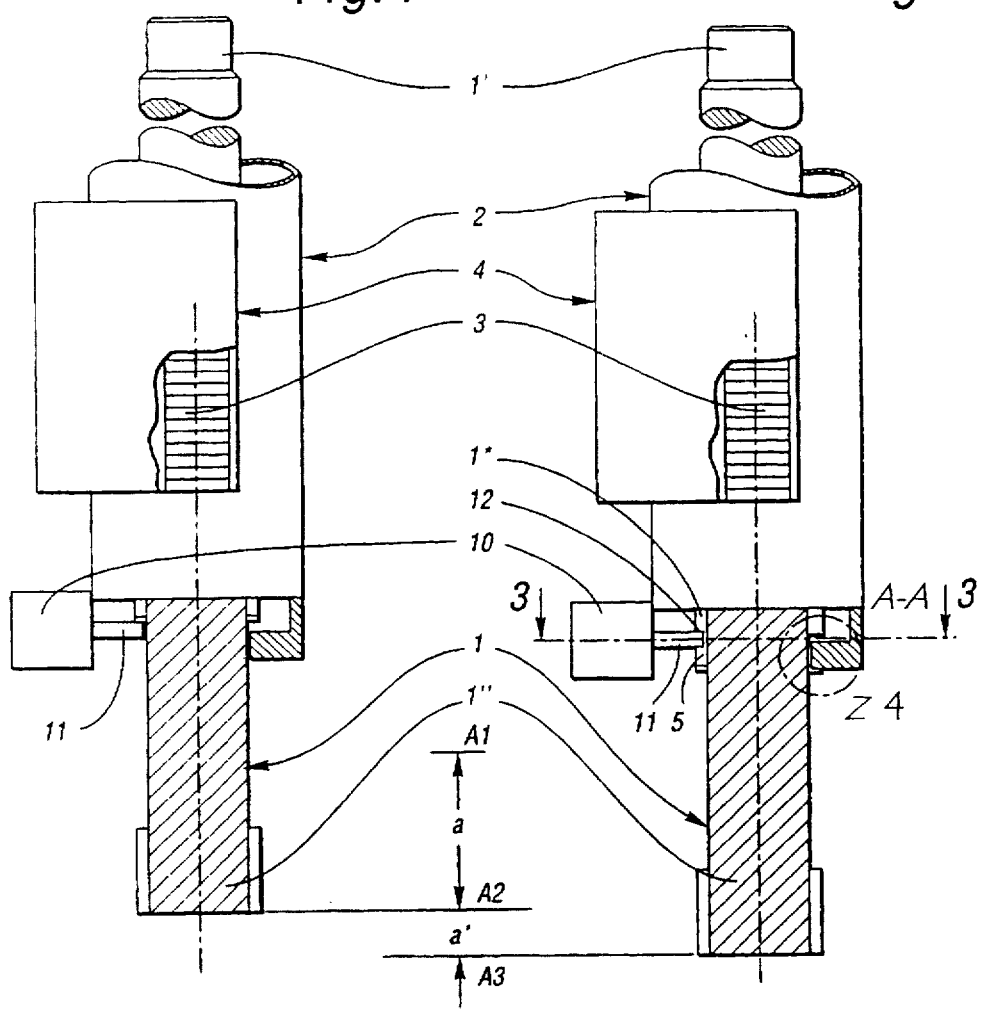
FIG. 1 is a view, in partial section and partly exploded, of the substantial portion of the steering device with the steering column in an end position of the displacement range positionable in the axial direction.
FIG. 2 illustrates the subject matter of FIG. 1 with the steering column in a position lying outside the positionable displacement range.
Figure 3:
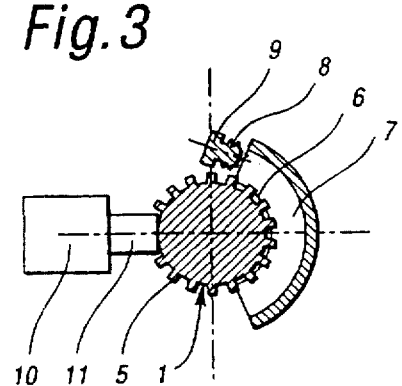
FIG. 3 is a section through the subject matter of FIG. 2 along the line A—A.
Figure 4:
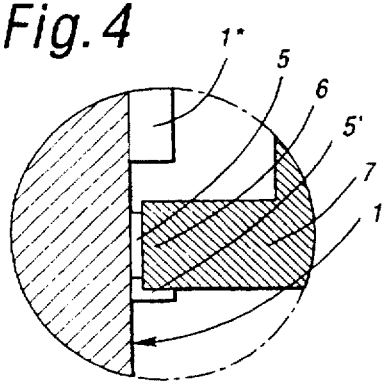
FIG. 4 is an enlarged detail "Z" of the subject matter of FIG. 2.
Figure 5:
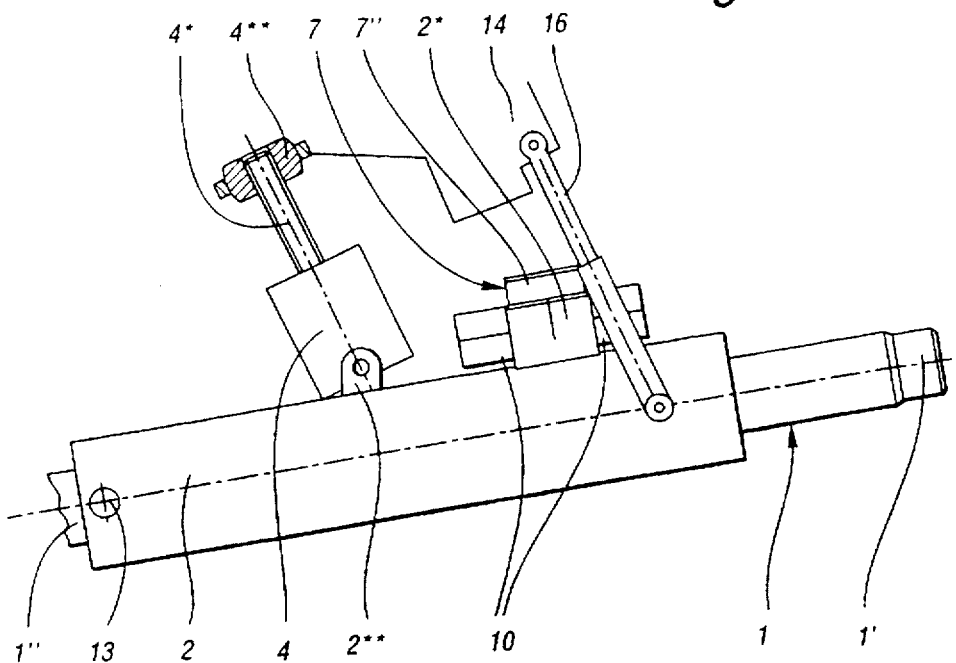
Figure 6:
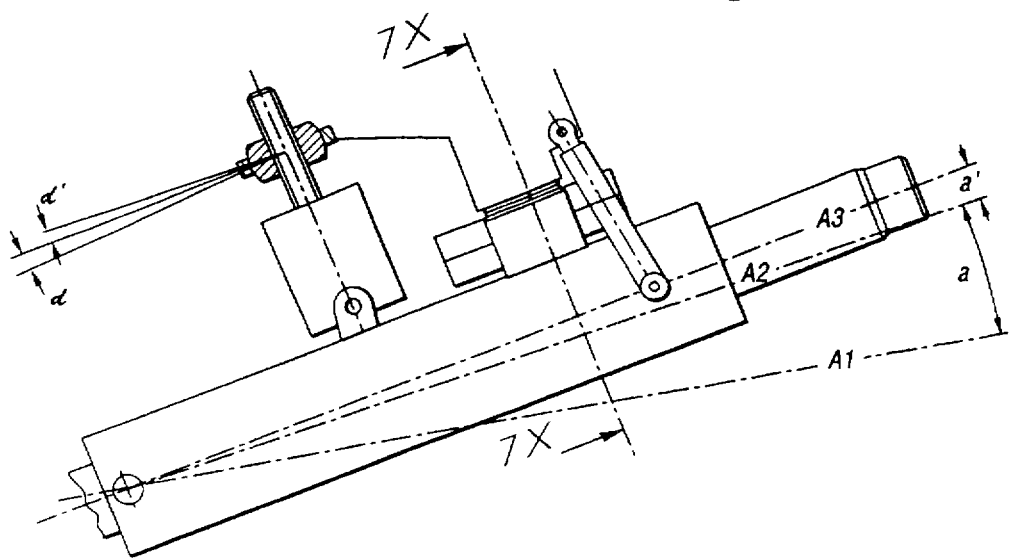
Figure 7:
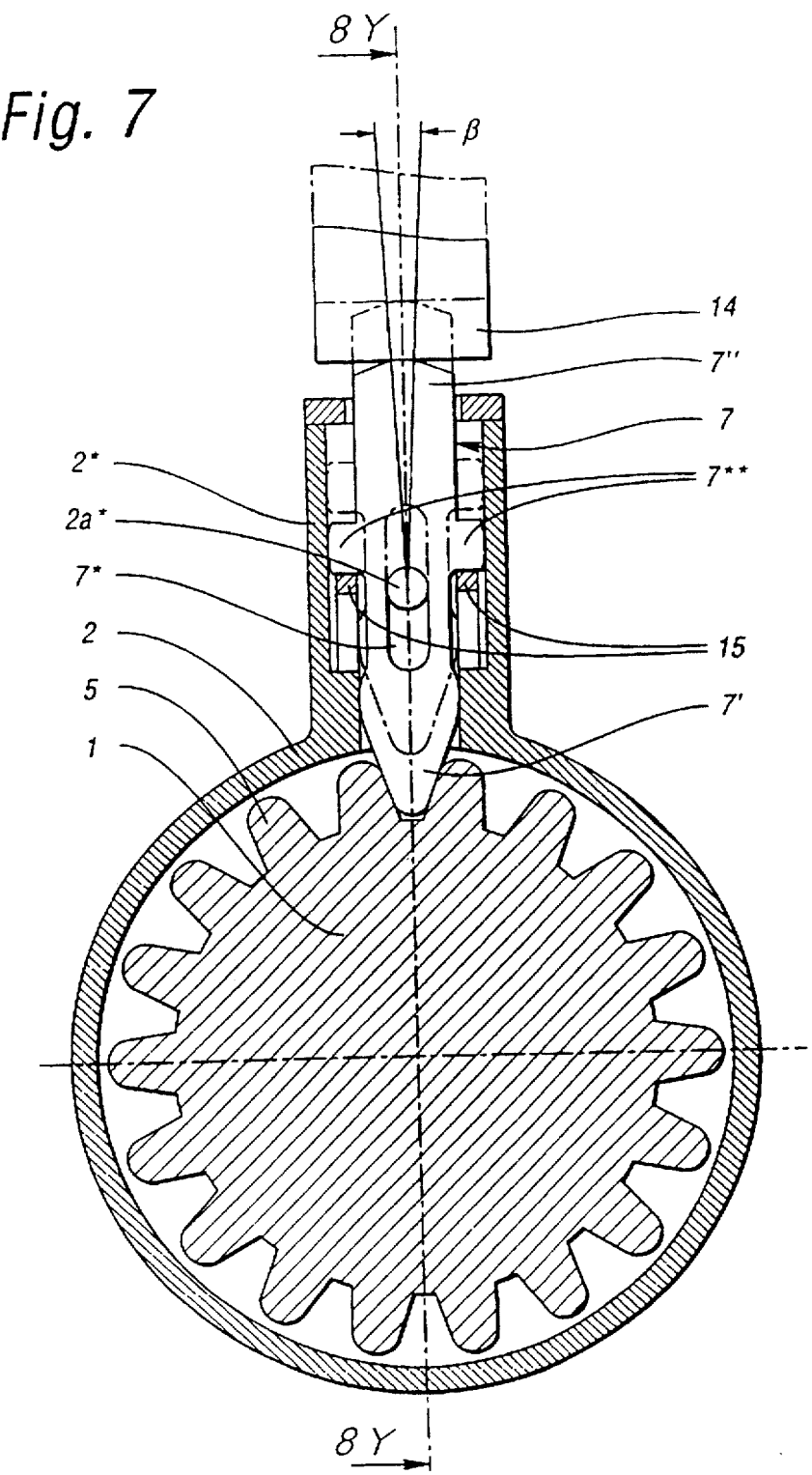

As can be seen from FIGS. 1–4 of the drawing, the upper portion of a two-part steering column 1 of a motor vehicle is partly arranged in a casing tube 2. The upper end 1' of the steering column projecting out of the casing tube is connectable in a positive and/or non-positive manner to a steering wheel which is not illustrated for the sake of simplicity. The lower portion of the steering column 1 allocated to the steering gear, which is also not shown for the sake of simplicity, is connected in a positive manner to the illustrated lower end 1" of the steering column via, for example, a sliding sleeve, which is also not shown for the sake of simplicity, such that the two portions are axially displaceable with respect to one another.

For the purposes of displacement in the axial direction, a rack-like axial tooth system 3 is attached to the region of the steering column 1 surrounded by the casing tube 2, the axial tooth system 3 cooperating with a motor-actuated positioning device 4 not illustrated in detail, through which the steering column 1 is positionable anywhere in an axial displacement range (a) between the end positions A1 and A2.

Furthermore, when the motor vehicle is stopped—e.g. by removing the ignition key—a further displacement of the steering column is forced over an additional displacement range (a'). The steering column thus enters the position A3 lying outside the displacement range (a). In this position, a radial tooth system 5 arranged on the steering column 1 and beneath the axial tooth system 3 is engaged with a radial tooth system 6 present on a locking element 7 which is connected to the casing tube 2. On account of this positive engagement, the steering column 1 is secured against all rotary movement.

To ensure that, when the two radial tooth systems 5, 6 are engaged, the possibility of collision between the toothed regions coming into engagement is practically excluded, these regions 5' are roof-shaped. In order to exclude all remaining possibility, the radial tooth system 6 of the locking element 7 in the peripheral direction is held with a slight clearance, i.e. the clearance is dependent on the tooth design, wherein the clearance behavior is influenced by a component 9 under the effect of a spring element 8.

In order to prevent the steering column 1 entering the locked position while the motor vehicle is being driven, a stop 11 which is removable via a means 10 having a magnetic effect—such as a lifting magnet—is allocated to the lower end position A2 of the displacement range (a), the stop 11 cooperating with a step 1* on the steering column.

This stop 11 is designed as a slide having a rectangular cross-section, the free end of which is concave in coordination with the radius of the cross-section of the steering column 1.

To ensure that the locked position is also secured, once the steering column 1 has reached the position A3 lying outside the displacement range (a), the slide forming the stop 11 moves into a gap 12 which is present between the step 1* on the steering column 1 defining the lower end position and the radial tooth system 5.

Naturally, in place of the above-described locking of the steering column 1, free-wheeling thereof may be implemented in order to prevent a force being transmitted to the allocated steering gear. In this case, for example, the steering column is moved beyond the upper end position A1 via the positioning device 4 so that the end 1" having the sliding sleeve mentioned at the start is disengaged.

Figure 5:
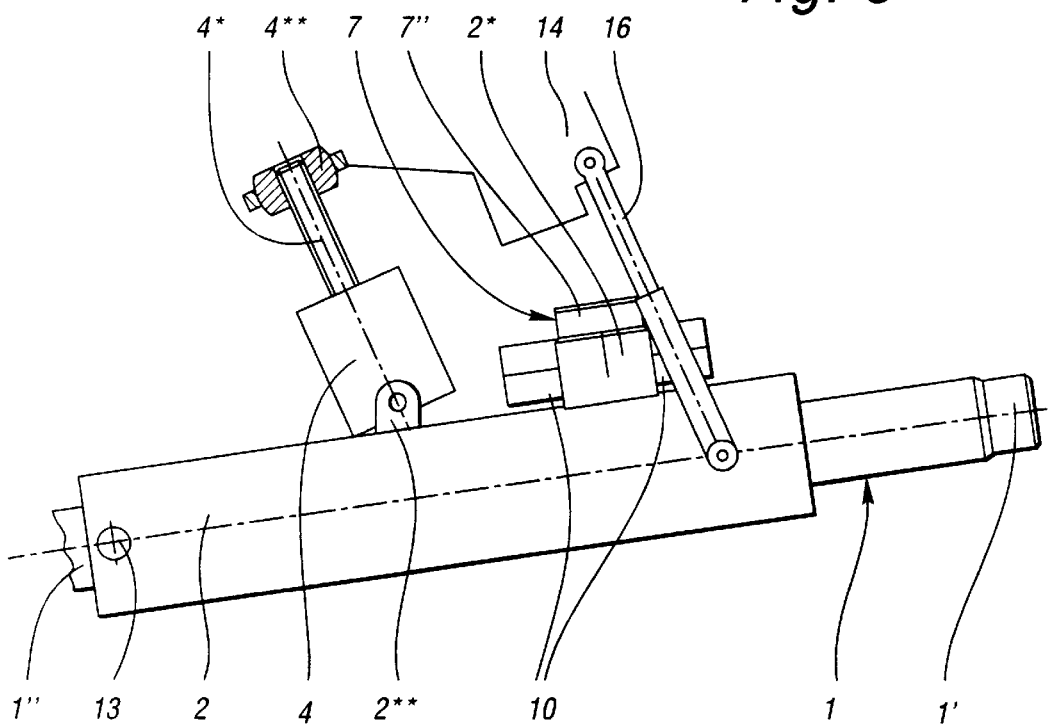
FIG. 5 is a view, in partial section, of the substantial portion of the steering device with the steering column in an end position of the displacement range positionable in the radial direction.
Figure 6:
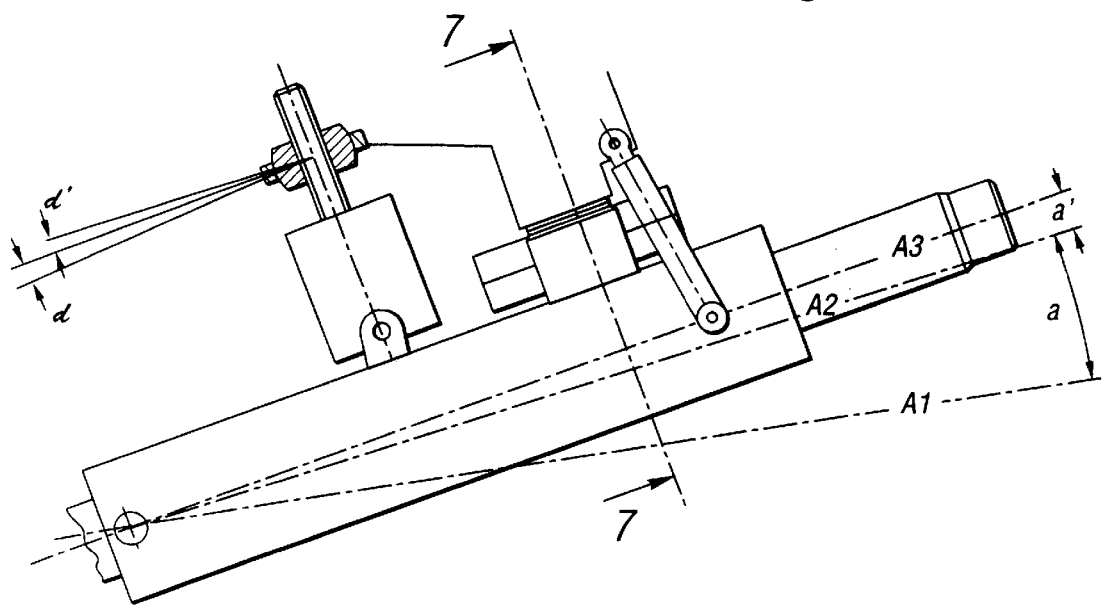
FIG. 6 is the subject matter of FIG. 5 with the steering column in a position lying outside the positionable displacement range.
Figure 7:
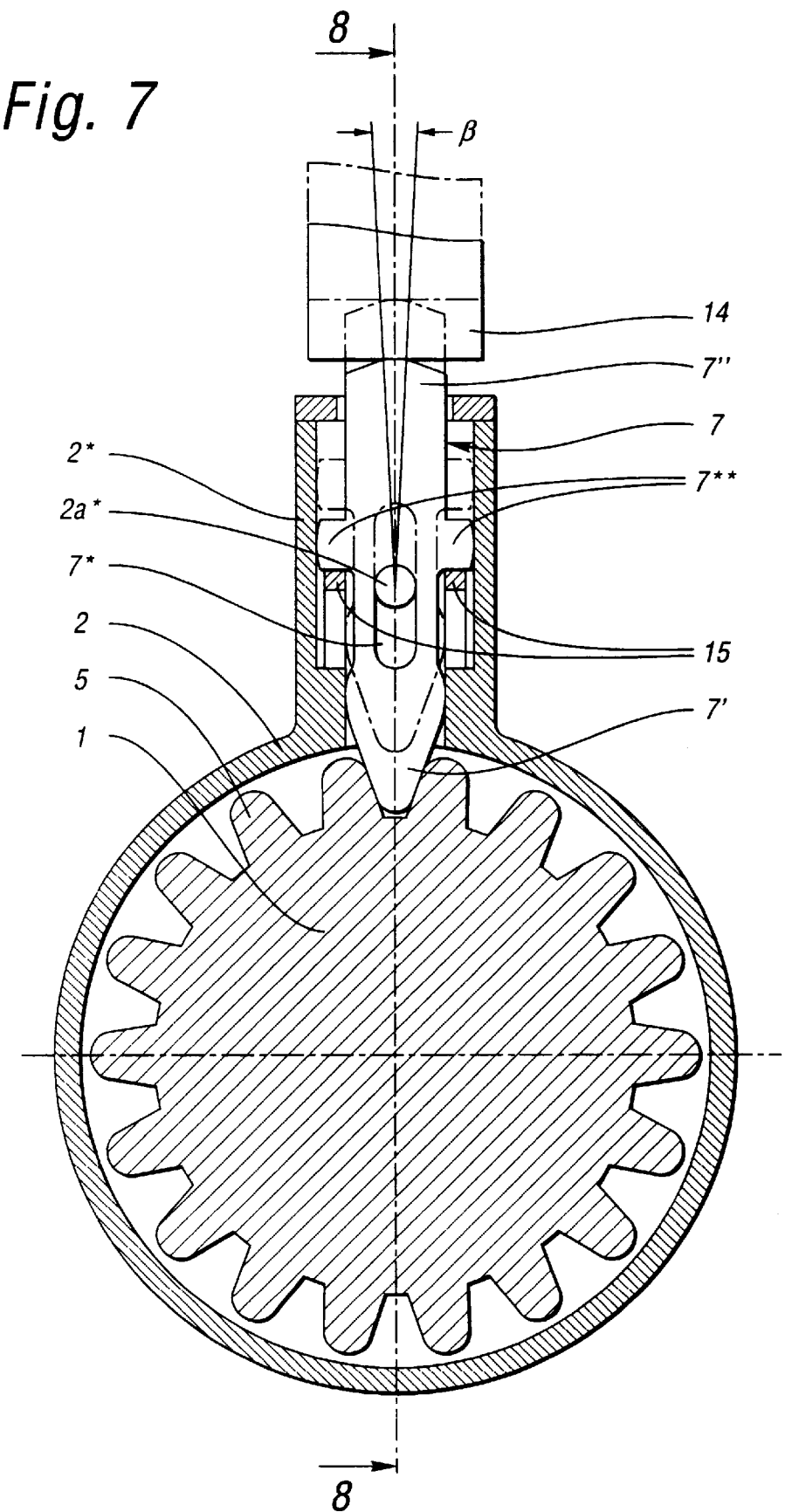
FIG. 7 is an enlarged section through the subject matter of FIG. 6 along the line X—X with a locking element engaged with the radial tooth system.
Figure 8:
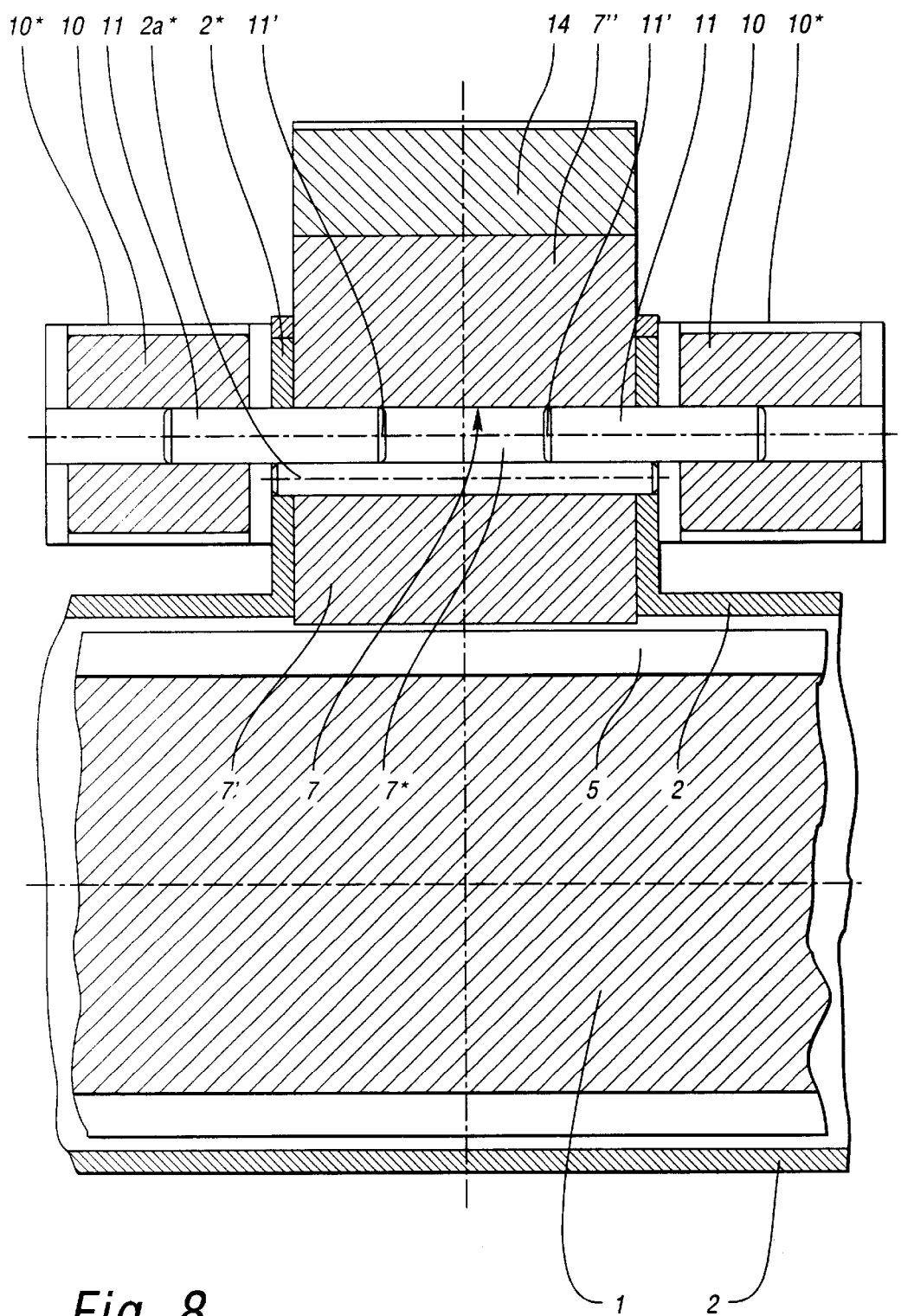
FIG. 8 is an enlarged section through the subject matter of FIG. 6 along the line Y—Y (FIG. 7) with a locking element not engaged with the radial tooth system.

As can be seen from FIGS. 5–8 of the drawing, the upper portion of a two-part steering column 1 of a motor vehicle is again partly arranged in a casing tube 2, wherein the upper end 1' of the steering column projecting out of the casing tube is also connectable in a positive and/or non-positive manner to a steering wheel which is not shown for the sake of simplicity. The lower portion of the steering column 1 allocated to the steering gear, which is also not shown for the sake of simplicity, is connected in a positive manner to the illustrated lower end 1" via a mechanism which is also not shown for the sake of simplicity such that a radial displacement about an axis of rotation 13 is implementable alone or in addition to the above-described axial displacement of the two portions.

For the purposes of displacing the upper portion of the steering column 1 in the radial direction, a motor-actuated positioning device 4 is, at one end, held swivellably within a certain range ($\alpha+\alpha'$) on the casing tube 2 surrounding the steering column via a mount 2** fixed thereto and, at the other end, is movably allocated to a releasing part 14, held fixed in place, via its positioning mechanism designed as a displaceable spindle 4* and a coupling element 4** connected thereto. In this way, the steering column 1 is positionable anywhere in a radial displacement range (a) between the end positions A1 and A2, wherein the coupling element makes a relative movement about the angular range $\alpha$.

Furthermore, when the motor vehicle is stopped—e.g. by removing the ignition key—a further displacement of the steering column is forced over an additional displacement range (a'). The steering column thus enters the position A3 lying outside the preset displacement range (a), wherein the coupling element executes a relative movement about the angular range $\alpha$. In this position, a locking element 7 arranged on the casing tube surrounding the steering column engages with a radial tooth system 5 which is present on the steering column 1. The steering column 1 is secured against any rotary movement on account of this positive engagement.

To ensure that clear ratios are obtained when the locking element 7 is allocated to the radial tooth system 5, the radial tooth system 5 and an end region 7' of the locking element 7 allocated thereto are wedge-shaped and are each rounded at the outermost end. In order also to exclude all remaining possibility of a neutral action, the other end region 7" of the locking element 7 arranged in a receiving body 2* present on the casing tube 2 is held slightly deflectably, i.e. is deflectable through an angle $\beta$ (FIG. 7), the extent of which is dependent on the tooth design. In this way, the clearance behavior is determined by the dimensions of two guide portions 7** molded onto the locking element 7 and allocated to opposite inner wall sections of the receiving body 2*, and by the dimensions of the end region 7' which is also allocated to two opposite inner wall regions of the receiving body.

Provided that the steering column 1 is in one of the positions A1 or A2 or an intermediate position, the locking element 7 is held out of the engagement range of the radial tooth system 5 by two spring elements 15 arranged in the receiving body 2*. The spring elements 15, which are designed as leaf spring-like compression springs, are each supported on one side on an inner wall zone of the receiving body and on the other side on the two guide portions 7** of the locking element.

When the steering column 1 is moved into the position A3, the locking element is moved, via the releasing part 14, against the force of the two compression springs in the direction of the steering column 1 and finally engages with the radial tooth system 5.

In order to prevent the steering column entering the locked position while the motor vehicle is being driven, two stops 11 (FIG. 8) which are removable via a magnetic means 10—preferably via two lifting magnets present in a housing 10* attached to the receiving body 2*—are allocated to an (upper) end position A2 of the preset displacement range (a), the stops 11 cooperating with a longitudinal hole 7* present in the central region of the locking element 7, extending in the direction of the longitudinal axis of the locking element 7 and allocated to a guide pin 2a* present on the receiving body. These stops 11 are each designed as slides having a rectangular cross-section, the free ends 11' of which, engaging in the longitudinal hole 7* from opposite sides above the guide pin 2a*, being provided with bevels 11" which should be regarded as an introduction aid.

In order to hold the casing tube 2 and thus the steering column 1 perfectly in the motor vehicle, the casing 2 is fixed to the releasing part 14 via at least one telescopic extension 16.

While the best mode for carrying out the invention has been described in detail, those familiar with the art to which this invention relates will recognize various alternative designs and embodiments for practicing the invention as defined by the following claims.

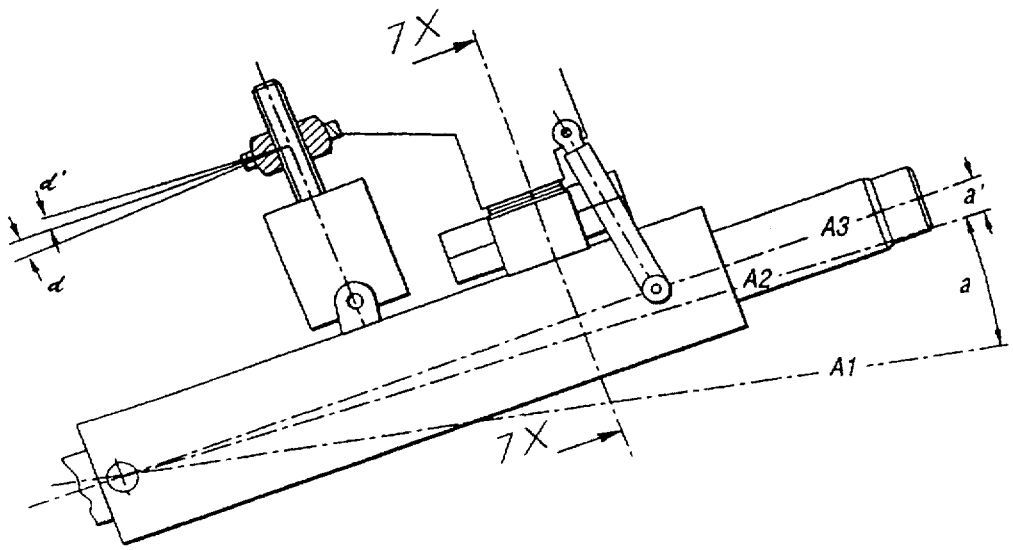

What is claimed is:

1. A steering device for motor vehicles having a steering column (1) at least partly surrounded by a casing tube (2), one end of the steering column being connected to a steering wheel and the other end being allocated to a steering gear, and which is positionable in an axial direction within a preset displacement range (a), comprising:

a positioning device (4) actuated by external force, the positioning device (4), when the motor vehicle is switched off, positioning a steering column (1) into an axial position (A3) lying outside the displacement range (a) so that a torsional force exerted on the steering column (1) via the steering wheel is not transmittable to the steering gear.

2. A steering device according to claim 1, wherein in the position (A3) outside the displacement range (a), a locking element (7) is held fixed in place in relation to the steering column (1), thereby forming a positive lock.

3. A steering device according to claim 2, wherein the locking element (7) is fixed to the casing tube (2) surrounding the steering column (1).

4. A steering device for motor vehicles having a steering column (1) at least partly surrounded by a casing tube (2), one end of the steering column being connected to a steering wheel and the other end being allocated to a steering gear, and which is positionable in an axial and/or radial direction within at least one preset displacement range (a), comprising:

at least one positioning device (4) actuated by external force, the positioning device (4), when the motor vehicle is switched off, positioning a steering column (1) into a position (A3) lying outside the displacement range (a), of which there is at least one, so that a torsional force exerted on the steering column (1) via the steering wheel is not transmittable to the steering gear, wherein in the position (A3) outside the displacement range (a), a locking element (7) is fixed to the casing tube (2) surrounding the steering column (1), thereby forming a positive lock, wherein the positive lock includes a radial tooth system (6) at least partly surrounding the steering column (1), present on the locking element (7) and extending perpendicular to the longitudinal axis of the steering column, and a corresponding radial tooth system (5) cooperating therewith provided on the steering column (1).

5. A steering device according to claim 4, wherein the two radial tooth systems (5, 6) are roof-shaped at their toothed regions (5', 6') to facilitate engagement.

6. A steering device according to claim 5, wherein the radial tooth system (6) on the locking element (7) is held thereupon in a peripheral direction with a slight clearance matched to tooth width.

7. A steering device according to claim 6, wherein the clearance is altered by a component (9) biased by a spring element (8).

8. A steering device for motor vehicles having a steering column (1) at least partly surrounded by a casing tube (2), one end of the steering column being connected to a steering wheel and the other end being allocated to a steering gear, and which is positionable in an axial and/or radial direction within at least one preset displacement range (a), comprising:

at least one positioning device (4) actuated by external force, the positioning device (4), when the motor vehicle is switched off, positioning a steering column (1) into a position (A3) lying outside the displacement range (a), of which there is at least one, so that a torsional force exerted on the steering column (1) via the steering wheel is not transmittable to the steering gear, wherein the steering column (1) has a rack-like axial tooth system (3) for axial displacement, and wherein a removable stop (11) cooperates with a step (1*) on the steering column (1) corresponding to the lower end position (A2) of the displacement range (a).

9. A steering device according to claim 8, wherein the stop (11) is removable by electromagnetic means (10).

10. A steering device according to claim 8 wherein the stop (11) is designed as a slide having a rectangular cross-section.

11. A steering device according to claim 10, wherein a free end of the slide allocated to the steering column (1) is concave, corresponding to the radius of the steering column cross-section.

12. A steering device according to claim 10, wherein a gap (12), into which the slide moves on the steering column (1) reaching the position (A3) lying outside the displacement range (a), is present between the step (1*) corresponding to the lower end position (A2) and the radial tooth system (5).

13. A steering device according to claim 8, wherein the steering column (1) is no longer engaged with the steering gear but rather is free-wheeling when positioned at (A3) outside the displacement range (a).

14. A steering device according to claim 13, wherein the steering column (1) is divided in the vicinity of the positioning device (4), so that two steering column portions are formed which disconnect from one another in the position (A3) outside the displacement range (a).

15. A steering device according to claim 4 wherein the positive lock comprises a radial tooth system (5) provided on the steering column (1), the locking element (7) which is displaceable radially in relation to the steering column (1), having a wedge-shaped end region (7') for engagement in the radial tooth system (5).

16. A steering device according to claim 15, wherein the steering column (1) is radially movable via the positioning device (4) about a pivoting axis (13) away from the end (1') of the steering column allocated to the steering wheel;

the locking element (7) on the casing tube (2) having a releasing part (14), held fixed in place, acting on one end region (7") of the locking element lying opposite the other wedge-shaped end region (7') thereof; and the locking element (7), under the influence of at least one spring element (15), being held such that, when the one end region (7") is not lying against the releasing part (14), the wedge-shaped other end region (7') is not engaged with the radial tooth system (5).

17. A steering device according to claim 16, wherein the locking element (7) is accommodated in a receiving body (2*) disposed on the casing tube (2).

18. A steering device according to claim 17 wherein the locking element (7) serves as a latching element under the influence of the compression spring element (15), of which there is at least one, arranged in the receiving body (2*).

19. A steering device according to claim 18, wherein the locking element (7) designed as a latching element is provided with a longitudinal hole (7*) to which is allocated a pin (2a*), fixed in place in the receiving body (2*).

20. A steering device according to claim 19 wherein one end region (7') of the locking element (7) is displaceably guided in the receiving body (2*) and the other end region (7") is deflectable about a specific angle β with respect to the longitudinal axis of the locking element (7).

21. A steering device according to claim 20 wherein at least one removable stop (11) is allocated to the locking element (7).

22. A steering device according to claim 21, wherein two stops (11) are present, each being removable by electromagnetic means (10) and being arranged in a housing (10*) allocated to the receiving body (2*) of the locking element (7).

23. A steering device according to claim 22, wherein the stops (11) comprise a slide having a rectangular cross-section, the free ends (11') of which being allocated to the longitudinal hole (7*) present in the locking element (7).

24. A steering device according to claim 23, wherein the free ends (11') of the slide allocated to the longitudinal hole (7*) in the locking element (7) are provided with bevels (11") acting as an introduction aid.

25. A steering device according to claim 24, wherein the longitudinal hole (7*) extends in the direction of the longitudinal axis of the steering column (1) and the housing (10*) allocated to each electromagnetic means (10) is attached to the receiving body (2*).

26. A steering device according to claim 1, wherein the positioning device (4) is driven by an electric motor.

* * * * *

UNITED STATES PATENT AND TRADEMARK OFFICE
CERTIFICATE OF CORRECTION

PATENT NO. : 5,813,699
DATED : Sep. 29, 1998
INVENTOR(S) : Donner et al.

It is certified that error appears in the above-identified patent and that said Letters Patent is hereby corrected as shown below:

The title page should be deleted to appear as per attached title page.

Please delete drawing sheets 1-3 and substitute drawing sheets 1-3 as per attached.

Signed and Sealed this

Fifteenth Day of June, 1999

Attest:

Q. TODD DICKINSON

*Attesting Officer*   Acting Commissioner of Patents and Trademarks

United States Patent

Donner et al.

[11] Patent Number: 5,813,699
[45] Date of Patent: Sep. 29, 1998

[54] STEERING DEVICE FOR MOTOR VEHICLES

[75] Inventors: Harald Donner, Meinerzhagen; Ralf Heinze, Lüdenscheid; Meinolf Kathol, Finnentrop; Jörg Welschholz, Herscheid, all of Germany

[73] Assignee: Leopold Kostal GmbH & Co. KG, Germany

[21] Appl. No.: 538,366

[22] Filed: Oct. 3, 1995

[30] Foreign Application Priority Data

Oct. 10, 1994 [DE] Germany ............... 44 36 091.6

[51] Int. Cl.⁶ ...................................... B62D 1/18
[52] U.S. Cl. ............................... 280/775; 74/493
[58] Field of Search ........................ 280/775, 771, 280/776, 779; 74/493, 492

[56] References Cited

U.S. PATENT DOCUMENTS

| | | | |
|---|---|---|---|
| 4,607,540 | 8/1986 | Kinoshita et al. | 74/493 |
| 4,793,204 | 12/1988 | Kubasiak | 74/493 |
| 4,934,737 | 6/1990 | Nakatsuka | 280/775 |
| 5,035,446 | 7/1991 | Arridsson | 280/775 |
| 5,294,149 | 3/1994 | Haldric et al. | 280/775 |
| 5,449,199 | 9/1995 | Heinrichs et al. | 280/775 |

FOREIGN PATENT DOCUMENTS

| | | | |
|---|---|---|---|
| 0402133 | 12/1990 | European Pat. Off. | 280/775 |
| 3933288 | 4/1990 | Germany | |
| 4210130 | 10/1992 | Germany | |

*Primary Examiner*—Christopher P. Ellis
*Attorney, Agent, or Firm*—Brooks & Kushman P.C.

[57] ABSTRACT

A steering device for motor vehicles having a steering column positionable in the axial and/or radial direction, in each case over a preset displacement range, via at least one positioning device actuated by external force. Locking of the steering column is implementable by a positioning device such that, when the motor vehicle is switched off, the steering column is positioned thereby into a position lying outside the displacement range(s) in which a torsional force exerted on the steering column via the steering wheel is not transmittable to the steering gear.

26 Claims, 4 Drawing Sheets